Feb. 14, 1939. J. W. BULLOCK ET AL 2,147,520

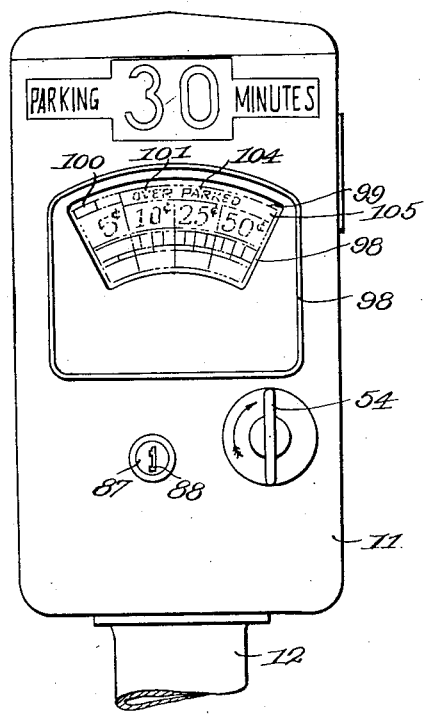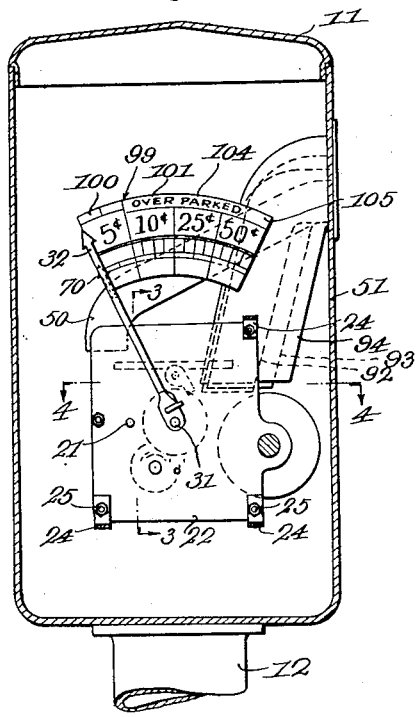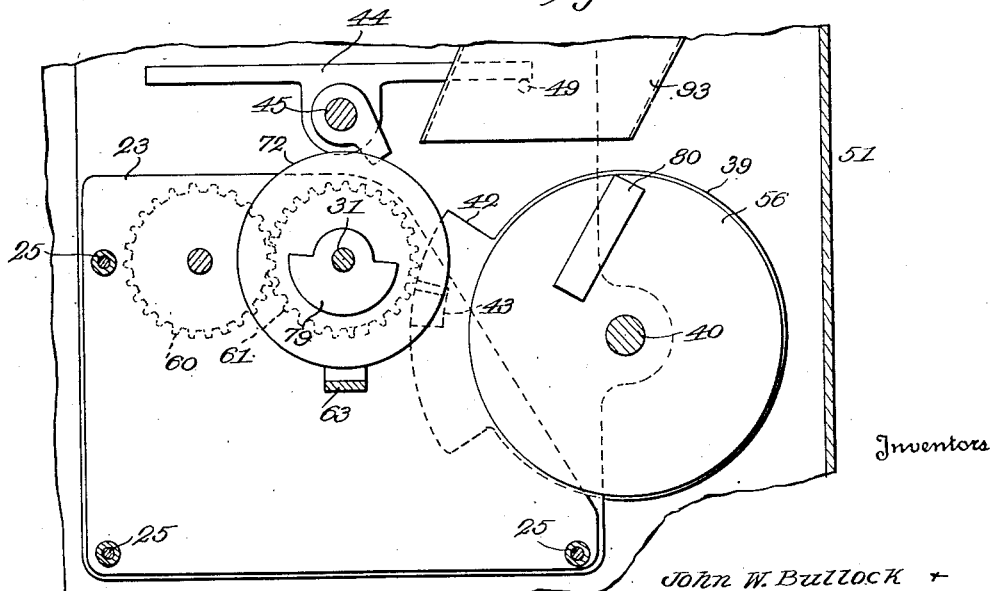

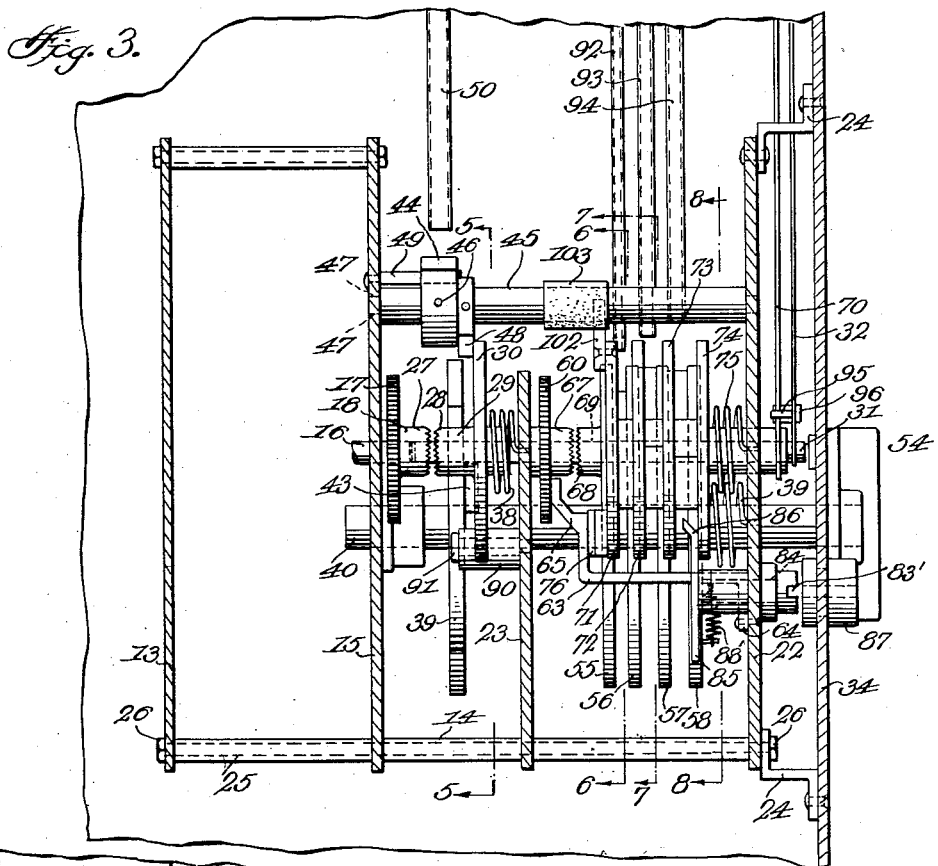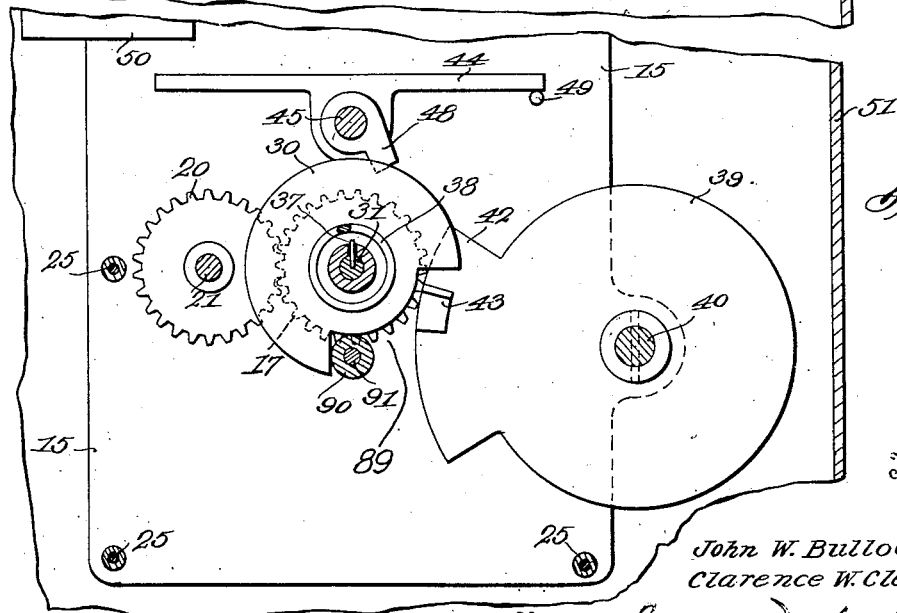

PARKING METER

Filed Jan. 8, 1937 4 Sheets-Sheet 3

Inventors

John W. Bullock &
Clarence W. Clementz

By Cushman, Darby, & Cushman

Attorneys

Feb. 14, 1939.   J. W. BULLOCK ET AL   2,147,520
PARKING METER
Filed Jan. 8, 1937   4 Sheets-Sheet 4

Inventors
John W. Bullock &
Clarence W. Clementz
By Cushman, Darby, & Cushman
Attorneys Patented Feb. 14, 1939

2,147,520

UNITED STATES PATENT OFFICE 2,147,520

PARKING METER

John W. Bullock, Miami, and Clarence W. Clementz, Jacksonville, Fla., assignors, by mesne assignments, to said John W. Bullock Application January 8, 1937, Serial No. 119,698

19 Claims. (Cl. 194—78)

The present invention relates to an improved parking meter of the non-locking type for registering the time a vehicle uses a parking space or the like.

An important object of the invention consists in associating with the meter indicating means, a coin controlled mechanism which upon the depositing of a coin of the proper denomination, initiates the operation of the indicating means to register the duration a vehicle is parked in a prescribed area.

A further object consists in providing the meter with a main indicator and an auxiliary indicator, and associating with the indicators means for restoring the same to their initial conditions at any time within a predetermined period. Additionally, the main indicator has associated therewith, means for returning the same to its original or zero position at the expiration of the predetermined period and for permitting the continued operation of the auxiliary indicator to register the overparking period a vehicle uses the parking space. Means are also provided to return the auxiliary indicator to its starting position upon the depositing of coin of the proper denomination into the meter, as indicated by the position of the auxiliary indicator.

A further object comprehends the provision of means associated with the meter to return the auxiliary indicator to its initial condition in the event a vehicle which has been overparked leaves without payment of the proper fee or fine.

Another object consists in operatively associating with the auxiliary indicator, spaced revoluble members arranged to be operatively connected or locked by a coin whereby upon the manual actuation of one of the members when a coin of the proper denomination is inserted between the members to cause the simultaneous movement of the members and the return of the auxiliary indicator to its initial position.

Other objects and advantages of the invention will be apparent from the following description when taken in conjunction with the accompanying claims and drawings.

Referring to the drawings, in which is shown a preferred embodiment of the invention, Figure 1 is a front face view of the meter;

Figure 2 is a sectional view taken substantially along the line 2—2 of Figure 4;

Figure 3 is an enlarged sectional view taken substantially along the line 3—3 of Figure 2;

Figure 5 is a detailed sectional view taken substantially along the line 5—5 of Figure 3;

Figure 7 is a detailed sectional view taken substantially along the line 7—7 of Figure 3;

Figure 4:
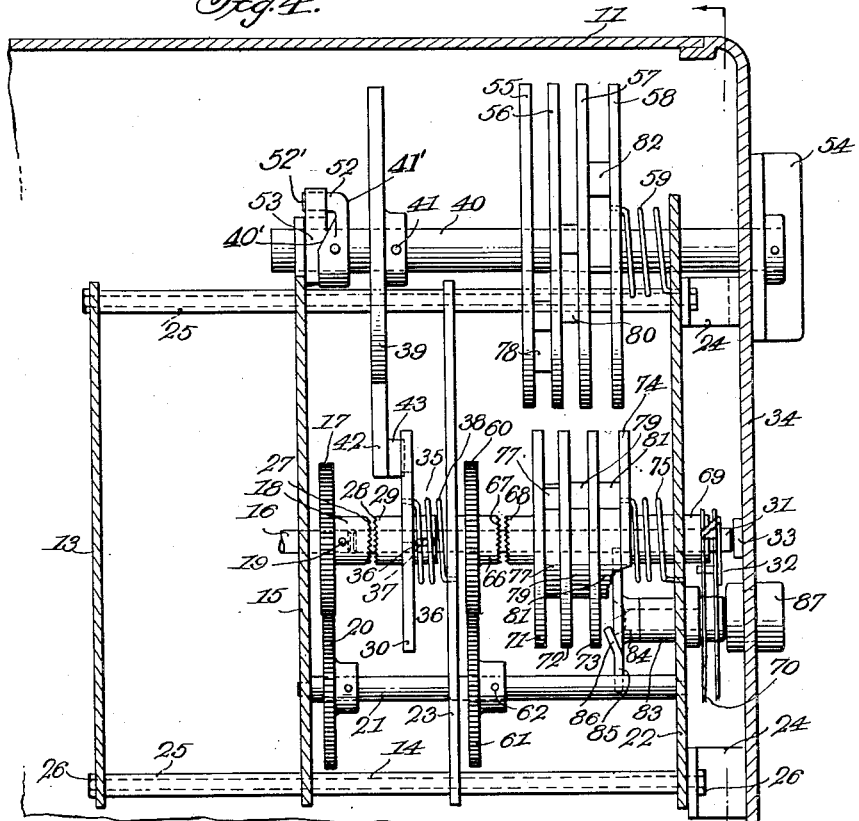
Figure 4 is an enlarged sectional view taken substantially along the line 4—4 of Figure 2.

Referring to the drawings in which like numerals indicate like parts in the several views, 11 designates the casing of the meter which may be supported by a standard or post 12 conveniently positioned on the pavement adjacent the parking space with which the meter is to be associated. The casing which may be of any suitable size and shape, has housed therein, a clock or time mechanism frame 13 and a meter supporting frame 14. The front plate or face 15 of the clock frame constitutes a bearing for the time or hour shaft 16 which is connected to a spring motor or the like of the clock, not shown, so as to be continuously operated. A gear 17 has its hub 18 fastened to the shaft 16 in any suitable manner, such as by the pin 19 (Figure 4) and is constantly in mesh with a gear 20 fastened to a shaft 21. The shaft 21 has one of its ends journalled in the plate 15 and has its opposite end journalled in the front plate 22 of the frame 14. The shaft 21 also extends through a plate 23 positioned between the plates 15 and 22 and which is of the configuration shown in Figure 6. The front plate 22 of the meter frame is connected to the forward wall 34 of the casing 11 by the spaced brackets 24 to which are secured the threaded bolts 25 by the nuts 26. The bolts 25 extend through the cross plates 15, 22 and 23 so as to firmly but detachably connect the parts of the clock frame and the meter frame to each other and to the casing.

The hub 18 of the gear 17 is provided with a clutch member 27 arranged to coact with a complementary clutch member 28 on the hub 29 which extends from one side of the disk 30 that is mounted on the meter shaft 31. The inner end of the shaft 31 extends within the hub 18 while its opposite end has secured thereto, a main indicator 32 and may thrust against a plate 33 on the front wall 34 of the casing. The plates 22 and 23 constitute bearing supports for the meter shaft 31 to maintain the shaft substantially in axial alignment with the time shaft 16.

The disk 30 has a hub or sleeve 35 extending from the side opposite the hub 29 and is provided with an elongated slot 36 to receive a pin 37 on the shaft 31 for securing the disk 30 to the shaft but permitting its axial movement relative thereto. A combined compression and torsional spring 38 has one end thereof secured to the disk 30 and its opposite end connected to the plate 23 so as normally to urge the clutch member 28 towards its complementary clutch member 27.

A disk 39 is fastened to an axially movable shaft 40 by the pin 41 and has a segmental extension 42 (Figure 5) which overlaps the disk 30 and is also provided with a cam 43 arranged, when moved into engagement with the disk 30, to impart an axial movement to the clutch member 28 away from the clutch member 27. Associated with the disk 30 is a balanced bar 44 fastened to the shaft 45 by the pin 46. The shaft 45 has its ends journalled as at 47 in the plates 15 and 22 (Figure 3). The balanced bar 44 has depending therefrom, an arm or finger 48 which normally extends into the path of the disk 30 to maintain the clutch member 28 out of engagement with its complementary clutch member 27 on the continuously operating time shaft 16. A stop 49 positioned adjacent one end of the bar 44 acts to normally maintain the bar in a substantially horizontal position. The opposite end of the bar extends beneath the discharge end of a coin chute 50 that has its opposite end terminating at the side wall 51 of the casing 11 (Figure 2). Thus, it will be seen that upon the insertion of a coin of the proper denomination into the chute 50 the balanced bar 44 will be tripped, causing the arm 48 to be moved out of the path of the disk 30, whereupon the spring 38 moves the clutch member 28 axially into engagement with its complementary clutch member 27 on the time shaft 16 to cause the rotation of the indicator 32 in a clockwise direction from its initial or zero position.

The shaft 40 adjacent its inner end has fastened thereon a collar 52, which is provided with a tapered face 40' arranged normally to engage a complementary tapered portion on a fixed member 53 carried by the plate 15, and through which the shaft 40 extends. The collar 52 has an outwardly extending arm 41' which terminates in a laterally disposed end or bent portion 52', which engages the member 53 when the parts are in their normal position. The outer end of the shaft 40 carries a knob 54 for effecting its manual rotation. It will be seen that upon the turning of the knob 54 in a clockwise direction, the tapered surface 40' of the collar 52 moves away from its complementary tapered surface on the fixed member 53 so as to engage the vertical face of the fixed member and thus impart an axial movement to the shaft 40. At the same time, the end 52' of the collar is moved away from the member 53. Conversely when the shaft 40 is rotated in an opposite direction, the tapered surface or face 40' will move to engage its complementary tapered surface on the member 53, and this return movement will be limited by reason of the engagement of the bent end 52' of the collar with the member or stop 53. A series of spaced disks or members 55, 56, 57 and 58 are fastened or otherwise rigidly connected to the shaft 40 for a purpose which will subsequently be described. A combined torsional and compression spring 59 secured at one end to the disk 58 and at its opposite end to the plate 22, acts when the shaft is rotated in a clockwise direction by the knob 54 to build up energy so that when the knob is released, it will move the shaft 40 and its associated parts in an opposite direction.

As shown in Figure 4, the clutch 28 is out of engagement with its complementary clutch member 27 and is maintained in this position by reason of the engagement of arm 48 with the side of the disk 30 (Figure 3). When the balance bar 44 is tripped by a coin, the arm 48 is raised to ride on the surface of the disk 30 while the tension of the spring 38 forces the clutch member 28 into engagement with the clutch member 27 to effect the rotation of the meter shaft 31 and the main indicator 32 through their connection with the time shaft 16. At the same time the disk 30 is brought into engagement with the extension 42 of the disk 39. When the parts are in this position, rotation of the shaft 40 by operation of the knob 54 in a clockwise direction, moves the disk 39 axially to the right (Figure 4) causing the disk 30 and its associated parts to be moved in the same direction and thus disengages the clutch member 28 from the clutch member 27 so as to disconnect the meter shaft 31 from the time shaft 16. When the disk 30 has been moved a sufficient distance away from the gear 17, the arm 48, which is now riding the surface of the disk 30, drops to overlap one side of the disk 30 and to maintain the clutch 28 in its disengaged position. This movement of the arm 48 returns the balance bar 44 to its normal horizontal position. The main indicator 32, which is connected to the shaft 31 is likewise returned to its zero position due to the counter-clockwise rotation of the disk 30 by the tension built up in the spring 38.

Figure 8:
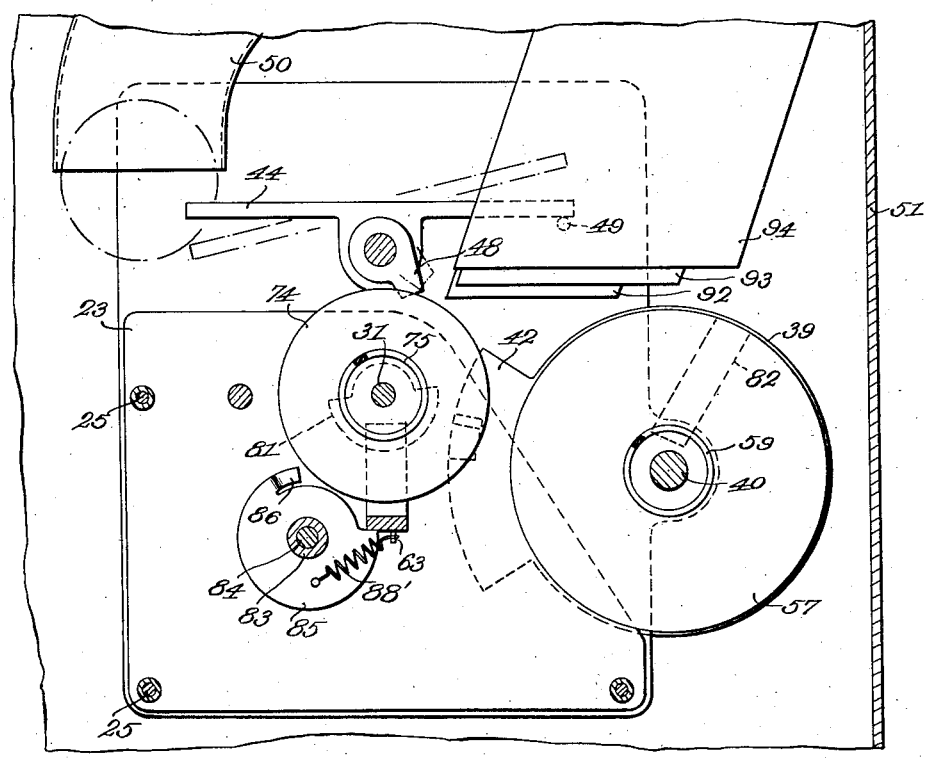
Figure 8 is a detailed sectional view taken substantially along the line 8—8 of Figure 3.

Revolubly mounted on the meter shaft 31 is a gear 60 in mesh with a gear 61 fastened by the pin 62 to the shaft 21 so as to be continuously driven through the gears 17 and 20 by the time shaft 16. A member 63 in the form of a bracket (Figure 3) is secured at one end as at 64 to the plate 22 and is provided with a bent arm portion or finger 65 which lightly bears against the outer side of the gear 60 to maintain the latter in a relatively fixed axial position. The hub 66 of the gear 60 has teeth 67 arranged to mesh with complementary teeth 68 on an axially movable sleeve or tubular member 69 which is revolubly mounted on the shaft 31. The outer end of the sleeve 69 extends through the plate 22 and has secured thereto an auxiliary indicator 70 which coacts with the main indicator 32 to register the time a vehicle is using the parking space associated with the meter. The sleeve 69 has a series of spaced disks or plate members 71, 72, 73 and 74, spaced from their complementary disk members on the shaft 40 and which are arranged to be connected thereto by a coin of the proper denomination in the manner as will be subsequently described. A combined torsional and compression spring 75 is fastened at one end to the disk 74 and has its opposite extremity secured to the plate 22 normally to move the teeth 68 towards the teeth 67 and also to rotate the disks 71, 72, 73 and 74 to return them to their initial positions when moved away therefrom. The disk 71 has a laterally projecting cam 76 (Figure 3) movable into engagement with the arm 65 of the bracket 63 to maintain the clutch member 68 out of engagement with the clutch member 67. The disk 71 is also provided with a segmental cam surface 77 (Figure 6) which coacts with a member 78 secured to one side of the disk 55 and adjacent the disks 56 and 72, for controlling the discharge of a coin from the space between these disks. The disk 72 also has a segmental cam surface 79 (Figure 7) which coacts with a member 80 on the disk 56 and adjacent the disks 73 and 57 for controlling the discharge of a coin between these disks. Likewise, the disk 73 has a segmental cam surface 81 (Figure 8) which coacts with a member 82 on the disk 57 and near disks 58 and 74 for controlling the discharge of a coin between these disks. A bushing 83 fastened to the plate 22 (Figure 4) receives a revoluble member or shaft 84 which at its inner end, carries a disk 85 having a laterally offset cam surface 86 (Figure 8) arranged to bear against the disk 74 for the purpose of constituting additional means for moving the clutch member 68 away from its complementary clutch member 67. A housing 87 extends through the outer face 34 of the casing and is provided with a key hole slot 88 for receiving a key which fits into a slot 83' in the head of the shaft 84 for the purpose of rotating the disk 85 to effect the disengagement of the clutch members 67 and 68. A spring 88' connected to the disk 85 and to the bracket 63 acts to return the shaft 84 to its original position when the key is released therefrom.

Figures 9, 10, 11:
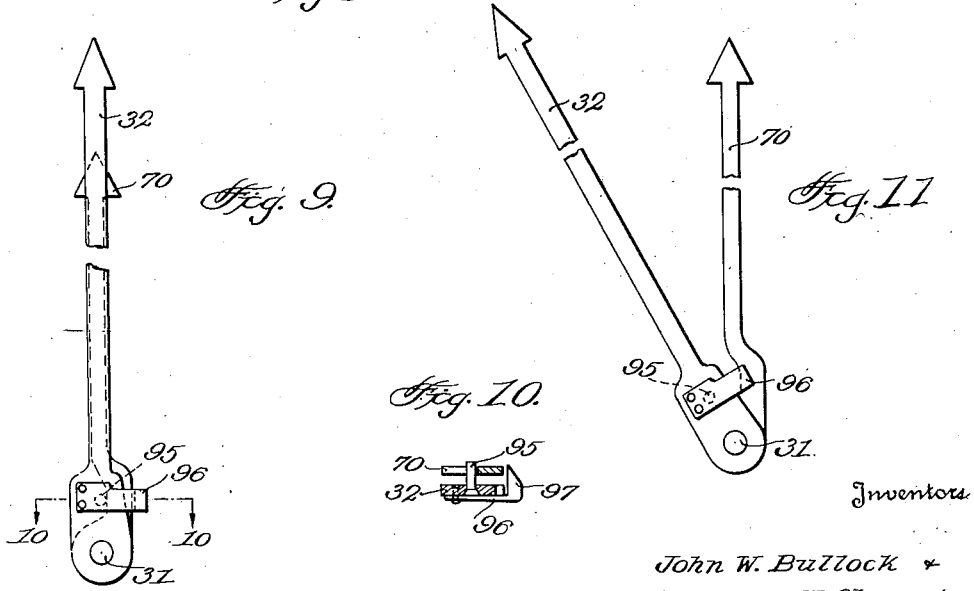
Figure 9 is a detailed view of the main indicator and the auxiliary indicator.
Figure 10 is a sectional view taken substantially along the line 10—10 of Figure 9.
Figure 11 is a view similar to Figure 9 showing the auxiliary indicator in a registering position and the main indicator at zero.

The disk 30 is provided with a cut-out portion 89 (Figure 5) which receives a rubber stop or other suitable cushioning member 90 carried by a bolt 91 threaded to the plate 23 (Figure 3) to limit the rotative movement of the disk 30. The side 51 of the casing (Figure 2), in addition to providing an entrance for a coin being deposited in the chute 50, may also be formed with a series of openings which separately communicate with the chutes 92, 93 and 94, for conducting coins of different denominations to the spaces formed between the disks on the sleeve 69 and the disks on the shaft 40. The main indicator 32 (Figure 10) is provided with a stud 95 positioned to one side of the auxiliary indicator 70 so that upon the movement of the main indicator from its initial or zero position by the connection of the meter shaft 31 with the time shaft 16, to cause the auxiliary indicator to be moved therewith. The main indicator 32 also carries a spring hook member 96 having an angularly bent portion 97 arranged to project into the path of the auxiliary indicator 70 so that upon the main indicator 30 being moved in a counter-clockwise direction, to move the auxiliary member 70 therewith. When the sleeve 69, which carries the auxiliary indicator 70, is moved axially inward to cause the teeth 68 to mesh with the teeth 67, the auxiliary indicator 70 carried by the sleeve 69 is likewise moved so as to clear the bent portion 97 of the member 96. Thus, means are provided to permit the main indicator 32 to be returned to its normal or zero position without affecting the advancing movement of the auxiliary indicator 70. Further, the auxiliary indicator 70, which is now being driven by the time shaft 16 through the connection of the gears 67 and 68, will continue to register the duration the meter is in operation without being interrupted. As the auxiliary indicator 70 is carried in its return movement by the sleeve 69, it will first be brought in engagement with the tapered side 97 of the spring hook 96 and then will ride past the same so as to assume the position shown in Figure 10.

The front face 34 of the casing has a window 98 (Figure 1) behind which is positioned a dial plate 99 suitably calibrated for registering the movement of the main indicator 32 and the auxiliary indicator 70 from their initial positions when the meter is in operation.

As shown, the meter is arranged to be associated with a parking space or the like for registering any time within two hours that a vehicle uses the space. Manifestly, the parts of the meter may be constructed and arranged to indicate any other periods of time as may be desired.

To operate the meter, we may assume the parts are in their disengaged or inoperative positions (Figure 3). To arrive at this position, the sleeve 69 has been previously moved outwardly so that the pin 95 on the main indicator 32 engages one side of the auxiliary indicator 70 and these indicators are now in their initial or zero positions and overlap one another as shown in Figure 2. The gear 17 carrying the clutch member 27 and the gear 60 carrying the clutch member 66 are being continuously driven by the time shaft 16 through the gears 20 and 61 but the movement of these parts will not be transmitted to the meter shaft 31 or the sleeve 69 since the arm 48 now engages the disk 30 and the cam 76 is moved to engage the arm 65 so that the movable clutch members 28 and 69 are free from engagement with their complementary clutch members 27 and 68 respectively.

When a vehicle is parked in the parking space associated with the meter, the driver initiates the operation of the meter by depositing a five cent piece in the slot 50 which causes the balance bar 44 to be tripped, thus releasing the engagement of the arm 48 with the disk 30, whereupon the spring 38 forces the clutch member 28 into engagement with its complementary clutch member 27 to effect a direct driving connection between the meter shaft 31 and the time shaft 16. Immediately, the main indiator 32 starts to move from its initial or zero position in a clockwise direction and carries with it, the auxiliary indicator 70, due to the engagement of the pin 95 with the latter. It will be noted that during this movement, the clutch 68 is moved out of engagement with the clutch member 67 by reason of the fact that the cam 76 on the disk 71 is now positioned in engagement with the arm 65 of the bracket 63 to prevent the sleeve 69 from being driven by the time shaft 16. The movement of the auxiliary indicator 70 with the main indicator causes the sleeve 69 to rotate and builds up energy in the spring 75 so as to return the parts to their normal positions when the shaft 31 is released from the shaft 16. During the initial driving operation of the meter shaft 31, the cam 43 on the extension 42 of the disk 39 extends within the recess 89, thus allowing the extension 42 to be moved close to the disk 30. As the disk 30 rotates in a clockwise direction, the recess portion 89 will not move away from the cam 43 until the expiration of a period of thirty minutes, at which time the upper adjacent edge of the disk 30 will be moved into engagement with the relatively fixed cam 43, thus causing the axial movement of the latter and the disengagement of the clutch 28 from the clutch 27.

Figure 6:
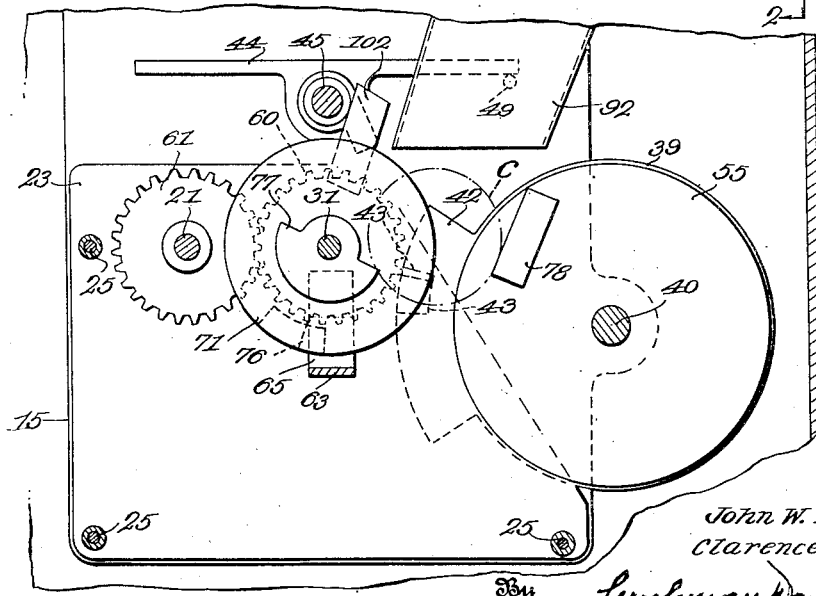
Figure 6 is a detailed sectional view taken substantially along the line 6—6 of Figure 3.

Should the driver or operator at any time within a half an hour after the vehicle is parked, remove the same from the parking space, he will see upon inspection of the dial 99 that the indicators are within the portion 100 and that his car may be removed without paying a fine. It is therefore only necessary for him to turn the knob 54 clockwise, which automatically resets or returns the indicators to their initial positions and disengages the clutch member 28 from the clutch member 27 to render the meter shaft inoperative. When the time shaft 16 is initially connected to the meter shaft 31, the disk 30 is moved into abutting engagement with the extension 42 of the disk 39 and will remain in this position for a period of thirty minutes. Consequently, the rotation of the shaft 40 by the actuation of the knob 54 causes the cam 52 to ride on the cam 53, thus moving the shaft 40 axially, which in turn moves the disk 30 and its associated parts in the same direction, to disengage clutch member 28 from the clutch member 27. As the disk 30 has been previously rotated in a clockwise direction due to the connection of the shaft 31 with the shaft 16, the tension built up in the spring 35 will cause the disk 30 and its associated parts to be rotated in a counter-clockwise direction to return them to their initial positions (Figure 6). The rubber stop 90 acts to cushion and limit the return movement of the disk 30 and is associated with the recess 89 to permit the disk 30 to be rotated in a clockwise direction for a period of two hours. Thus, it will be seen that for the first half hour of parking, the meter will operate upon the depositing of a coin of the proper denomination in the slot 50 and that the parts may be returned to their initial conditions upon the actuation of the knob 54 at any time within this period. Further, during the operation of the shaft 31, the sleeve 69 is disconnected from the time shaft and is rotated by reason of the connection of the auxiliary indicator 70 with the main indicator 32 through the pin 95. As the axial movement of the disk 30 frees the arm 43, the latter will drop to one side of this disk and the balance bar 44 will be returned to its normal horizontal position to maintain the clutch member 28 disengaged from its complementary clutch member 27 until the balance bar is again released by the depositing of the proper coin in the chute 50. In order to prevent the depositing of a coin less than that required in the chute 50, the latter may have an opening therein of such dimensions as to discharge a coin such as a penny from the five cent slot before it can reach the balance bar 44. Each of the chutes may also be provided with magnetic means to prevent a slug from actuating the balance bar 44 or the delivery of a slug between the disks to lock the same.

Should the car remain parked over the allowed period, in the present instance, thirty minutes, the main indicator 32 will be, at the expiration of this period, automatically returned to its initial position without affecting the advanced position of the auxiliary indicator 70, by virtue of the fact that after the meter has been operated for thirty minutes, the cam 43 on the disk 39 is moved to engage the disk 30 and moves the latter axially to effect disengagement of the clutch member 28 with its complementary clutch member 27. At the same time, the cam 76 on the disk 71 is moved out of engagement with the arm 65. The main indicator 32 on the shaft 31 during the allowed parking period drives the auxiliary indicator 70 through the pin 95; when this period has expired, the main indicator returns to its normal position, and the auxiliary indicator 70 fixed to the sleeve 69 is operatively connected to the time shaft 16 through the connection of the clutch member 68 on the sleeve 69 with the clutch member 67 on the gear 60 to effect the continued rotation of the auxiliary indicator 70 and its associated parts. It might be mentioned that the cam 43 on the disk 39 and the cam 76 on the disk 71 are so co-related either by an advance of time or an elapse of time to cause the engagement of the clutch member 69 with the clutch member 67 substantially immediately upon the slipping off of the cam 76 from the arm 65 and the engagement of the cam 43 with the disk 30.

When a vehicle is overparked, it will be necessary to deposit a coin in one of the chutes 92, 93 or 94 of the proper denomination, depending upon the duration the vehicle remains in the parking space, in order to return the auxiliary indicator to its original condition and disconnect the sleeve 69 from the shaft 16. Thus, assuming that the car is parked over a half an hour and less than an hour, the auxiliary indicator will then be moved to register with the portion 101 of the dial plate 99 (Figure 2) which indicates that a ten cent piece must be inserted in the proper coin slot to render the meter inoperative and restore the parts to their initial conditions. Upon a ten cent piece C being inserted in the chute or passage 92, it will fall between the spaced disks 55, 56 and 71 and 72 so as to assume the dotted line position shown in Figure 6 and will constitute a lock for connecting the shaft 40 with the sleeve 69. In the meantime, the cam 77 on the disk 71 and the member 78 on the disk 55 have been moved by rotation of their respective disks to prevent the ten cent piece from falling between the disks to a coin box positioned in the bottom of the meter, thus, the coin will be maintained between these disks and upon the rotation of the shaft 40 by the actuating of the knob 54, the axial movement imparted to the shaft by the cams 52 and 53 will cause the sleeve 69 to be moved axially to disengage the clutch member 68 from its complementary clutch member 67, and disconnect the sleeve 69 from the time shaft 16. At the same time, the energy stored in the springs 59 and 75 will cause the shaft 40 and the sleeve 69 as well as their associated parts to be moved counter-clockwise to their initial positions. This movement may be arrested by a lug 102 on the disk 71 which is moved into abutting engagement with a rubber stop 103 carried by the shaft 45 (Figure 3).

The axial movement of the sleeve 69 for effecting disengagement of the clutch 68 from the clutch 67 also acts to offset the disks relative to the chutes 92, 93 and 94, so that the chutes are positioned over the spaces between the disks and thus constitute stops which prevent the lifting of the coin out of the space between the disks when the latter are returned to their initial positions by the tension of the springs 59 and 75 respectively. The return movement of the disks also causes the cam 77 and member 78 to move away from the coin to permit the latter to be discharged into the coin box.

Should the car remain overparked for a period between sixty minutes and ninety minutes, the auxiliary indicator will be moved to register with the portion 104 of the dial 99 which will indicate that a twenty-five cent piece must be deposited in the meter to render the same inoperative. Upon a coin of the proper denomination being inserted in the chute 93, it will be carried between the bars of the disks 56, 57 and 72 and 73 and its downward movement is arrested when it is brought into engagement with the cam 79 and the member 80 (Figure 7). The rotation of the shaft 40 by the knob 54 will thereupon effect the disengagement of the clutch member 68 with the clutch member 67 and the parts will be returned to their original positions by the springs 59 and 75 in the manner as previously described.

Should the car remain parked more than an hour and a half and less than two hours, the auxiliary indicator 70 is moved to register with the portion 105 which indicates that a fifty cent piece must be deposited in the meter to return the parts to their normal inoperative positions. Upon the depositing of a coin of this amount in the chute 44, the coin is held between the pairs of disks 57, 58 and 73 and 74 by reason of the movement of the cam 81 on the disk 73 (Figure 8) and the member 82 of the disk 57 so as to prevent the coin from falling through the space between these disks. Thus, the shaft 40 is locked to the sleeve 69 and upon rotation of the knob 54, the clutch 68 is moved axially away from the clutch 67 to disengage the sleeve 69 from the time shaft 16 in the manner as previously described.

The cams 77, 79 and 81 on the disks carried by the sleeve member 69 and the complementary members 78, 80 and 82 on the disks on the shaft 40 are of slightly larger width than the particular coin with which they are to be associated, and are positioned relative to each other so as to be successively moved into the path of their respective chutes to preclude a coin of the proper denomination from passing therethrough at different predetermined intervals.

The meters are conveniently positioned in a parking area or block and require the services of a patrolman or attendant who should inspect each of them at intervals of about a half an hour or at such times as is represented by the allowable parking limit the meter is set to register.

Should the car be removed from the parking space without payment of the proper fee, the auxiliary indicator may be returned to its initial position by the insertion of a key into the slot 88 to connect the key with the rotatable member 84 that carries the disk 85. Upon the rotation of the disk 85 in a clockwise direction, the cam surface 86 is moved into engagement with the disk 74 (Figure 4) which causes the sleeve 69 to be moved axially so as to disengage the clutch member 68 from the clutch member 67, thus permitting the return of the auxiliary indicator and its associated parts to their original positions. The gears 17, 20, 60 and 61 are each of the same diameter and have the same gear ratio so as to rotate the shaft 31 and the sleeve 69 at the same speed when the time shaft 16 is connected to them.

It will be seen when the meter is associated with the parking space in which a car is allowed to be parked for a predetermined period, that upon the initial payment of a predetermined fee, means are provided upon the depositing of this fee in the meter within this period, for automatically restoring the main indicator 32 and the auxiliary indicator 70 to their initial or zero positions and at the same time, disconnecting the meter shaft 31 from the continuously operating time shaft 16. Further, should the car remain overparked, it will be necessary, in order to return the parts to their initial positions and render the meter inoperative, to deposit a coin of the proper denomination as determined by the position of the auxiliary indicator 70 relative to the dial 99 in order to effect a locking engagement by the coin between the shaft 40 and the sleeve 69 to actuate the parts so that they may be returned to their normal positions and the meter rendered inoperative. Upon the expiration of the allowable parking period, the main indicator 32 is automatically returned to its original position and at the same time, the sleeve 69 which is independently operable by the time shaft 16 is connected to the latter so as to cause the continued movement of the auxiliary indicator 70 in a clockwise direction to register the overparking period.

As the attendant or policeman visits each of the meters at intervals of about a half an hour, he will be able to determine if a car using the parking space has overparked and if it has, make a notation on his book to that effect so that in the event it is removed without payment of the proper fee, he can report this fact to the proper authorities.

It is to be understood that the form of the invention shown is merely illustrative of a preferred embodiment and that such changes may be made without departing from the spirit of the invention, as fall within the purview of one skilled in the art without departing from the spirit of the invention and the scope of the appended claims.

We claim:—

1. A meter of the class described including a continuously operating time shaft, a meter shaft, means for detachably connecting the meter shaft to the time shaft, an indicator connected to the meter shaft, means for normally maintaining the meter shaft disconnected from the time shaft, a coin control mechanism operatively associated with the meter shaft to connect the same to the time shaft upon the actuation of the controlled mechanism by a coin to initiate the actuation of the indicator, and means at any time within a predetermined period for effecting the release of the meter shaft from the time shaft.

2. A meter of the class described including a continuously operating time shaft, a meter shaft, means for detachably connecting the meter shaft to the time shaft, an indicator connected to the meter shaft, means for normally maintaining the meter shaft disconnected from the time shaft, a coin control mechanism operatively associated with the meter shaft to connect the same to the time shaft upon the actuation of the controlled mechanism by a coin to initiate the actuation of the indicator, means at any time within a predetermined period for effecting the release of the meter shaft from the time shaft, means at the expiration of the predetermined period for disconnecting the meter shaft from the time shaft, and means for restoring the indicator to its original condition upon the release of the meter shaft from the time shaft.

3. A meter of the class described including a continuously operating time shaft, a meter shaft, means for detachably connecting the meter shaft to the time shaft, a main indicator connected to the meter shaft, an auxiliary indicator releasably connected to the main indicator, means for normally rendering the indicators inoperative, means for operatively connecting the meter shaft to the time shaft to initiate the actuation of the main indicator, means connecting the auxiliary indicator to the main indicator when the latter is connected to the time shaft, means for restoring the main indicator to its initial condition at the expiration of a predetermined period, and means automatically connecting the auxiliary indicator to the time shaft after the expiration of the predetermined period.

4. A meter of the class described including a continuously operating time shaft, a meter shaft, means for detachably connecting the meter shaft to the time shaft, a main indicator connected to the meter shaft, an auxiliary indicator arranged to be releasably connected to the main indicator, means for detachably connecting the auxiliary indicator to the time shaft, means for normally rendering the indicators inoperative, means for operatively connecting the meter shaft to the time shaft to initiate the actuation of the main indicator, means connecting the auxiliary indicator to the main indicator during the movement of the latter by the time shaft simultaneously to actuate the indicators, means at any time within a predetermined period to return the indicators to their initial conditions, and means to restore the main indicator to its initial condition at the expiration of the predetermined period without affecting the advanced position of the auxiliary indicator.

5. A meter of the class described including a continuously operating time shaft, a meter shaft, means for detachably connecting the meter shaft to the time shaft, a main indicator connected to the meter shaft, an auxiliary indicator arranged to be releasably connected to the main indicator, means for detachably connecting the auxiliary indicator to the time shaft, means for normally rendering the indicators inoperative, means for operatively connecting the meter shaft to the time shaft to initiate the actuation of the main indicator, means connecting the auxiliary indicator to the main indicator during the movement of the latter by the time shaft to simultaneously actuate the indicators, means to disengage the meter shaft from the time shaft after the expiration of a predetermined period, means for returning the main indicator to its initial position when the meter shaft is disengaged from the time shaft without affecting the advanced position of the auxiliary indicator, and means for connecting the auxiliary indicator to the time shaft upon the release of the meter shaft therefrom.

6. A parking meter of the class described including a continuously operating time shaft, a meter shaft having a main indicator, means for detachably connecting the meter shaft to the time shaft, an auxiliary indicator, means releasably connecting the auxiliary indicator to the main indicator, means for detachably connecting the auxiliary indicator to the time shaft, means for normally maintaining the indicators in their inoperative positions, coin controlled means for operatively connecting the meter shaft to the time shaft to initiate the actuation of the main indicator, means connecting the auxiliary indicator to the main indicator during the movement of the latter by the time shaft, means for releasing the connection of the meter shaft from the time shaft at the expiration of a predetermined period, means for connecting the auxiliary indicator to the time shaft upon release of the meter shaft to cause the uninterrupted actuation of the auxiliary indicator, means for returning the main indicator to its initial position upon the meter shaft being released from the time shaft, and means for disconnecting the auxiliary indicator from the time shaft.

7. A parking meter of the class described including a continuously operating time shaft, a meter shaft having a main indicator, means for detachably connecting the meter shaft to the time shaft, an auxiliary indicator, means releasably connecting the auxiliary indicator to the main indicator, means for detachably connecting the auxiliary indicator to the time shaft, means for normally maintaining the indicators in their inoperative positions, coin controlled means for operatively connecting the meter shaft to the time shaft to initiate the actuation of the main indicator, means connecting the auxiliary indicator to the main indicator during the movement of the latter by the time shaft, means for releasing the connection of the meter shaft from the time shaft at the expiration of a predetermined period, means for connecting the auxiliary indicator to the time shaft upon release of the meter shaft to cause the uninterrupted actuation of the auxiliary indicator, means for returning the main indicator to its initial position upon the meter shaft being released from the time shaft, and means operable by coins of different denominations for disconnecting the auxiliary indicator from the time shaft.

8. A parking meter of the class described including a continuously operating time shaft, a meter shaft having a main indicator, means for detachably connecting the meter shaft to the time shaft, an axially movable sleeve on the meter shaft, said sleeve having an auxiliary indicator associated with the main indicator, means for detachably connecting the sleeve to the time shaft, means for normally rendering the indicators inoperative, a coin controlled mechanism operatively associated with the meter shaft to connect the same to the time shaft upon the actuation of the control mechanism by a coin of the proper denomination, means to prevent the operative connection of said sleeve to the time shaft during a predetermined period of operation of the meter, means connecting the auxiliary indicator to the main indicator when the main indicator is driven by the time shaft, means for returning the main indicator to its original condition at the expiration of a predetermined period, and means for selectively connecting said sleeve to the time shaft at the expiration of the predetermined period.

9. A parking meter of the class described including a continuously operating time shaft, a meter shaft having a main indicator, means for detachably connecting the meter shaft to the time shaft, a freely revoluble and axially movable sleeve on the meter shaft, said sleeve having an auxiliary indicator associated with the main indicator, means for detachably connecting the sleeve to the time shaft, means for normally rendering the indicators inoperative, a coin controlled mechanism operatively associated with the meter shaft to connect the same to the time shaft upon the actuation of the control mechanism by a coin of the proper denomination, means to prevent the operative connection of said sleeve to the time shaft during a predetermined period of operation of the meter, means connecting the auxiliary indicator to the main indicator when the main indicator is driven by the time shaft, means operable by a coin deposited in the control mechanism within the predetermined period, for causing the disconnection of the meter shaft from the time shaft, means for restoring the indicators to their initial positions upon the disconnection of the meter shaft from the time shaft within the predetermined period, means for disengaging the meter shaft from the time shaft at the expiration of the predetermined period and for returning the main indicator to its initial position, and means for moving the sleeve to release the auxiliary indicator from the main indicator when the latter is returned to its initial position and for operatively connecting the sleeve to the time shaft to continue the actuation of the auxiliary indicator.

10. A parking meter of the class described including a continuously operating time shaft, a meter shaft having a main indicator, means for detachably connecting the meter shaft to the time shaft, an auxiliary indicator, means releasably connecting the auxiliary indicator to the main indicator, means for detachably connecting the auxiliary indicator to the time shaft, means for normally maintaining the indicators in their inoperative positions, coin controlled means for operatively connecting the meter shaft to the time shaft to initiate the actuation of the main indicator, means connecting the auxiliary indicator to the main indicator during the movement of the latter by the time shaft, means for releasing the connection of the meter shaft from the time shaft at the expiration of a predetermined period, means for connecting the auxiliary indicator to the time shaft upon release of the meter shaft to cause the continuous actuation of the auxiliary indicator, means for returning the main indicator to its initial position upon the meter shaft being released from the time shaft, means operable by coins of different denominations for effecting the disengagement of the auxiliary indicator from the time shaft, means upon the release of the auxiliary indicator from the time shaft for returning the former to its initial position, and manually operable means for disconnecting the auxiliary indicator from the time shaft.

11. A parking meter of the class described including a continuously operating time shaft, a meter shaft, means for detachably connecting the meter shaft to the time shaft, a main indicator connected to the meter shaft, a freely revoluble and axial movable sleeve on the meter shaft, an auxiliary indicator connected to said sleeve, means for detachably connecting the sleeve to the time shaft, means for normally rendering the indicators inoperative, a coin controlled mechanism operatively associated with the meter shaft to connect the same to the time shaft upon the actuation of the control mechanism by a coin of the proper denomination, means to release the meter shaft from the time shaft at any time within a predetermined period and to return the indicators to their initial position, means to prevent the operative connection of the sleeve to the time shaft during the predetermined period, means connecting the auxiliary indicator to the main indicator when the latter is connected to the time shaft, revoluble means associated with the sleeve and arranged to be locked thereto by a coin for releasing the sleeve from the time shaft, and means upon the depositing of the coin to lock the revoluble means to the sleeve for effecting the release of the sleeve from the time shaft.

12. A parking meter of the class described including a continuously operating time shaft, a meter shaft, means for detachably connecting the meter shaft to the time shaft, a main indicator connected to the meter shaft, a freely revoluble and axial movable sleeve on the meter shaft, an auxiliary indicator connected to said sleeve, means for detachably connecting the sleeve to the time shaft, means for normally rendering the indicators inoperative, a coin controlled mechanism operatively associated with the meter shaft to connect the same to the time shaft upon the actuation of the control mechanism by a coin of the proper denomination, means to release the meter shaft from the time shaft at any time within a predetermined period and to return the indicators to their initial position, means to prevent the operative connection of the sleeve to the time shaft during the predetermined period, means connecting the auxiliary indicator to the main indicator when the latter is connected to the time shaft, revoluble means associated with the sleeve and arranged to be locked thereto by a coin for releasing the sleeve from the time shaft, means upon the depositing of the coin to lock the revoluble means to the sleeve for effecting the release of the sleeve from the time shaft, and means for returning the sleeve to its initial position when it is released from the time shaft.

13. In a parking meter, a continuously operating shaft, a revoluble member having an indicator, means for releasably connecting said member to the shaft, said member having a series of spaced discs, an actuator extending into the meter and having a series of complementary disposed discs arranged to register with the discs on said member, means for moving the actuator axially, the space between the adjacent discs being arranged to receive coins of different denominations to effect the locking of the member to the actuator, means for depositing a coin into each of the spaces between the adjacent discs, and means when a coin of the proper denomination is positioned in one of the spaces for moving the actuator to effect the release of the member from the shaft.

14. In a parking meter, a continuously operating shaft, a revoluble member having an indicator, means for releasably connecting said member to the shaft, said member having a series of spaced discs, an actuator extending into the meter and having a series of complementary disposed discs arranged to register with the discs on said member but laterally spaced therefrom, means for moving the actuator axially, the space between the adjacent discs being arranged to receive coins of different denominations to effect the locking of the member to the actuator, and means to impart axial movement to the member to release the same from the operating shaft, the discs on said member having means coacting with complementary means on the discs of the actuator to prevent coins positioned between adjacent discs from falling therethrough at predetermined intervals during the operation of the meter.

15. In a parking meter, a continuously operating shaft, a revoluble member having an indicator, means for releasably connecting said member to the shaft, said member having a series of spaced discs, a revoluble actuator extending into the meter and having a series of complementary disposed discs arranged to register with the discs on said member but laterally spaced therefrom, means for moving the actuator axially, the space between the adjacent discs being arranged to receive coins of different denominations to effect the locking of the member to the actuator, each of the discs on said member having a segmentally disposed cam surface arranged to coact with a projection on a complementary disc on the actuator for preventing a coin positioned between the adjacent discs from falling therethrough at predetermined intervals during the operation of the machine, and means when a coin is positioned between the discs for rotating the actuator to effect the disengagement of said member from the shaft.

16. In a parking meter, a continuously operating shaft, a revoluble and axially displaceable member having an indicator, means for releasably connecting said member to the shaft, said member having a series of spaced discs, a revoluble actuator extending into the meter and having a series of complementary disposed discs arranged to register with the discs on said member, means for moving the actuator axially, the space between the adjacent discs being arranged to receive coins of different denominations to effect the locking of the member to the actuator, each of the discs on said member having a segmentally disposed cam surface arranged to coact with a projection on a complementary disc on the actuator for preventing a coin positioned between the adjacent discs from falling therethrough at predetermined intervals during the operation of the machine, chutes for conducting coins to the spaces between the discs to effect the operative connection of the actuator with the revoluble member, and means operable when a coin is positioned between the discs for moving the actuator to disengage said member from said shaft, the chutes when the discs are axially displaced acting to prevent the lifting of the coin from between the discs.

17. A parking meter of the class described including a continuously operating time shaft, a meter shaft, means for detachably connecting the meter shaft to the time shaft, a main indicator connected to the meter shaft, a freely revoluble and axial movable sleeve on the meter shaft, an auxiliary indicator connected to said sleeve, means for detachably connecting the sleeve to the time shaft, means for normally rendering the indicators inoperative, a coin controlled mechanism operatively associated with the meter shaft to connect the same to the time shaft upon the actuation of the control mechanism by a coin of the proper denomination, means to prevent the operative connection of the sleeve to the time shaft during a predetermined period of operation of the meter, means connecting the auxiliary indicator to the main indicator when the latter is connected to the time shaft, means operable by a coin deposited in the controlled mechanism at any time within the predetermined period for disconnecting the meter shaft from the time shaft, means operable by the meter shaft in the event the proper coin is not deposited in the control mechanism at the expiration of the predetermined period, for disconnecting the meter shaft from the time shaft, and means for connecting the sleeve to the time shaft when the meter shaft is released therefrom.

18. A parking meter of the class described including a continuously operating time shaft, a meter shaft, means for detachably connecting the meter shaft to the time shaft, a main indicator connected to the meter shaft, a freely revoluble and axial movable sleeve on the meter shaft, an auxiliary indicator connected to said sleeve, means for detachably connecting the sleeve to the time shaft, means for normally rendering the indicators inoperative, a coin controlled mechanism operatively associated with the meter shaft to connect the same to the time shaft upon the actuation of the control mechanism by coin of the proper denomination, means to prevent the operative connection of the sleeve to the time shaft during a predetermined period of operation of the meter, means connecting the auxiliary indicator to the main indicator when the latter is connected to the time shaft, means operable by a coin deposited in the controlled mechanism at any time within the predetermined period for disconnecting the meter shaft from the time shaft, means operable by the meter shaft in the event the proper coin is not deposited in the control mechanism at the expiration of the predetermined period for disconnecting the meter shaft from the time shaft, and means operable by the movement of the sleeve for causing the latter to be connected to the time shaft when the meter shaft is released therefrom.

19. A parking meter of the class described including a continuously operating time shaft, a meter shaft, means for detachably connecting the meter shaft to the time shaft, a main indicator connected to the meter shaft, a freely revoluble and axial movable sleeve on the meter shaft, an auxiliary indicator connected to said sleeve, means for detachably connecting the sleeve to the time shaft, means for normally rendering the indicators inoperative, a coin controlled mechanism operatively associated with the meter shaft to connect the same to the time shaft upon the actuation of the control mechanism by coin of the proper denomination, means to prevent the operative connection of the sleeve to the time shaft during a predetermined period of operation of the meter, means connecting the auxiliary indicator to the main indicator when the latter is connected to the time shaft, means operable by a coin deposited in the controlled mechanism at any time within the predetermined period for disconnecting the meter shaft from the time shaft, means operable by the meter shaft in the event the proper coin is not deposited in the control mechanism at the expiration of the predetermined period for disconnecting the meter shaft from the time shaft, means operable by the movement of the sleeve for causing the latter to be connected to the time shaft when the meter shaft is released therefrom, said sleeve having a series of spaced discs, a revoluble actuator extending into the meter and provided with a series of complementary disposed discs arranged to register with the discs on the actuator, means to move the actuator axially, the space between adjacent discs being arranged to receive coins of different denominations to effect the locking of the sleeve to the actuator, means for depositing a coin into each of the spaces between the adjacent discs, and means when a coin of the proper denomination is positioned in one of the spaces to move the actuator to effect the release of the sleeve from the time shaft.

JOHN W. BULLOCK.
CLARENCE W. CLEMENTZ.